(12) United States Patent
Lewis

(10) Patent No.: US 6,965,781 B1
(45) Date of Patent: Nov. 15, 2005

(54) OBTAINING AN INTELLIGENT ROAMING DATABASE TEMPLATE

(75) Inventor: John E. Lewis, Lawrenceville, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 440 days.

(21) Appl. No.: 10/080,765

(22) Filed: Feb. 22, 2002

(51) Int. Cl.[7] .............................. H04B 7/00; H04Q 7/20
(52) U.S. Cl. .......................... 455/522; 455/62; 455/551; 455/419; 455/432.1; 455/433
(58) Field of Search ........................ 455/522, 62, 552.1, 455/419, 433, 432.1, 551

(56) References Cited

U.S. PATENT DOCUMENTS

| | | | |
|---|---|---|---|
| 5,832,367 A | | 11/1998 | Bamburak et al. |
| 6,075,988 A | * | 6/2000 | Anderson et al. ............ 455/434 |
| 6,259,914 B1 | * | 7/2001 | Koster ..................... 455/432.1 |
| 6,263,211 B1 | * | 7/2001 | Brunner et al. ............. 455/464 |
| 6,456,843 B1 | * | 9/2002 | Daly ......................... 455/419 |
| 2002/0193103 A1 | * | 12/2002 | Daly ......................... 455/419 |
| 2003/0054809 A1 | * | 3/2003 | Bridges et al. ............. 455/419 |
| 2003/0186695 A1 | * | 10/2003 | Bridges et al. ............. 455/432 |

* cited by examiner

Primary Examiner—Nick Corsaro
Assistant Examiner—Shaima Q. Aminzay
(74) Attorney, Agent, or Firm—Withers & Keys, LLC

(57) ABSTRACT

An apparatus and method for obtaining IRDB information for a mobile communication device in a multi-service telecommunication service provider environment. The apparatus includes a table stored in a memory, the table containing a plurality of ESN features associated with mobile telecommunication devices for a plurality of wireless markets, the ESN features being compared with an ESN acquired from a mobile communication device in a multi-service telecommunication service provider network for determining an up-to-date IRDB template to be downloaded to the mobile communication device. The method includes receiving an ESN from a mobile communication device; querying a table containing a plurality of features associated with a mobile telecommunication devices for a plurality of wireless markets in accordance with the ESN received from the mobile communication device; and selecting an IRDB template from an IRDB database based on the ESN received from the mobile communication device and the features contained in the table.

28 Claims, 2 Drawing Sheets

OBTAINING AN INTELLIGENT ROAMING DATABASE TEMPLATE

BACKGROUND

A mobile communication device (e.g., wireless phone, cellular phone, wireless personal digital assistant, and the like) used in a mobile wireless telecommunication system, when turned on in a particular geographical area, searches for a "home" wireless telecommunication service provider or other wireless telecommunication service providers with which a subscriber to the wireless telecommunication service has a pre-arranged agreement. This situation occurs because there are generally multiple wireless telecommunication service providers in any given geographical area. Depending on the pre-arranged agreement, different service providers will charge different rates, with the "home" rate generally being the least expensive and the other rates being more expensive.

The rates charged by service providers other than the home service provider are generally referred to as roaming charges. Therefore, as a subscriber to a wireless telecommunication service moves from one geographic region of the country to another, the subscriber will be charged different rates depending on which service provider the mobile communication device locks into in that particular wireless market. To address this problem, mobile communication devices generally store a table in an internal memory circuit. The memory circuit may include storage devices such as random access memory (RAM), read only memory (ROM), and/or programmable read only memory (PROM). The table stored in the memory includes a list service providers including an optimal service provider (e.g., the home service provider that provides the least expensive connection charges) and a plurality of other service providers with which the subscriber may have pre-arranged wireless (e.g., cellular) roaming agreements. The plurality of other providers is generally arranged in the list in some form of priority. Therefore, as a subscriber moves from one geographic region of the country to another, the wireless device when turned on searches for the home service provider (e.g., the optimal provider) or another service provider with which the subscriber has a pre-arranged roaming agreement in order of preference. Wireless roaming agreements between each service provider enable wireless communication service providers to offer lower roaming rates to their subscribers (e.g., customers) and maintain profitability only if the mobile communication device is able to find and register with a proper (e.g., correct) mobile communication system when traveling or roaming outside the subscriber's wireless home-coverage area.

Wireless communication service providers created an intelligent roaming feature to address the problems created by the expansion of wireless communication service providers in a given geographic location, as well as throughout the country, and the increased functionality and capability of contemporary mobile communication devices for locating many different wireless communication service providers in all wireless markets. Intelligent roaming automatically ensures that a subscriber can access their preferred wireless communication service providers when traveling or roaming outside their wireless home-coverage area. Intelligent roaming works by entering a list of wireless communication service providers and their frequency bands, ranked by priority, into an Intelligent Roaming Database (hereinafter "IRDB") stored in the memory of the mobile communication device.

To help direct the mobile communication device in locating the correct wireless communication service provider while roaming in a variety of wireless markets, an IRDB can be initially stored in the mobile communication device or can be downloaded to each individual communication device from a base station. During an intelligent roaming process, the wireless mobile communication device scans all available frequency bands to determine which service providers are available in the current geographic region. When a recognized service provider is located, the mobile communication device registers with, or "locks onto," the particular service provider. Generally, the service provider will be the subscriber's home wireless communication service provider because generally it is given top priority. If the subscriber's home wireless communication service provider does not provide service in the area, the IRDB instructs the mobile communication device to search for a partner service provider in the current geographic region. If a partner is not available, the mobile communication device scans for a wireless communication service provider that is "favored," or categorized in the IRDB, over one that is not categorized in the IRDB. Services that do not meet the wireless communication service provider's standards can be classified as "forbidden," for example. With the exception of making 911 calls, the mobile communication device will generally not select a forbidden wireless communication service provider's network.

The intelligent roaming control function can potentially result in significant savings for the wireless communication service provider. It also makes it possible for the wireless communication service provider to offer additional services. Intelligent roaming also allows the wireless communication service provider to increase quality and reliability at a lower cost by rapidly moving roaming traffic between different communication providers based on various predetermined parameters such as the price and quality of the service provided by each communication provider, for example.

As roaming agreements change over time, the IRDB must be updated in every mobile communication device to match any new agreements. Updated IRDBs can be downloaded to each communication device over the airwaves at certain predetermined intervals, such as every month, for example. Large wireless communication service providers usually require multiple IRDBs because not all mobile communication devices share the same capabilities such as the capability of operating at multiple bands or the homed system may be an "A" or "B" band, or may be in a "PCS" frequency range, for example. To optimize revenues, IRDBs for specific geographic regions can be created to customize the selection of a wireless communication service provider for that region.

Selecting the correct IRDB to download for each mobile communication device can be overwhelming. Conventional technology utilizes mobile communication device type and mobile communication system type that the mobile communication device is homed from to determine the IRBD selection process. The information is downloaded from the mobile communication system (e.g., a base station) to the communication device via a Short Messaging Service Center (hereinafter "SMS message center"), which allows short text messages to be exchanged between wireless mobile communication devices and other networks over a wireless network. From the billing system of the wireless communication service provider, and possibly through auxiliary processing centers, the SMS message center is provided with a template number associated with a correct IRDB to be stored in the SMS message center for each mobile communication device that requires a new or updated IRDB. The process of selecting the correct IRDB does not always work correctly because of frequent changes in the customer's equipment (e.g., customer purchases new mobile communication device). Reference to customer equipment also can be located across several different databases, thus exacerbating the problem.

SUMMARY

According to one aspect the invention provides a memory for storing data for access by an application program executed by a computer for obtaining IRDB information for a mobile communication device in a multi-service telecommunication service provider environment. The memory includes a table stored in the memory, the table containing a plurality of ESN features associated with mobile telecommunication devices for a plurality of wireless markets, the ESN features being compared with an ESN acquired from a mobile communication device in a multi-service telecommunication service provider network for determining an up-to-date IRDB template to be downloaded to the mobile communication device.

Another aspect of the invention provides an apparatus for obtaining IRDB information for a mobile communication device in a multi-service telecommunication service provider environment. The apparatus includes means for containing a plurality of ESN features associated with mobile telecommunication devices for a plurality of wireless markets, the ESN features being compared with an ESN acquired from a mobile communication device in a multi-service service telecommunication service provider network for determining an up-to-date IRDB template to be downloaded to the mobile communication device.

Still a further aspect of the invention provides an apparatus for obtaining IRDB information for a mobile communication device in a multi-service telecommunication service provider environment. The apparatus includes means for receiving an ESN from a mobile communication device; means for querying a table containing a plurality of features associated with a mobile telecommunication devices for a plurality of wireless markets in accordance with the ESN received from the mobile communication device; and means for selecting an IRDB template from an IRDB database based on the ESN received from the mobile communication device and the features contained in the table.

Yet a further aspect of the invention provides an apparatus for obtaining correct IRDB information for a mobile communication device in a multi-service telecommunication service provider environment. The apparatus includes means for receiving a registration notification message from a mobile communication device; means for querying a table containing a plurality of features associated with a mobile telecommunication devices for a plurality of wireless markets in accordance with the ESN received from the mobile communication device; means for selecting an IRDB template from an IRDB database based on the value of the ESN received from the mobile communication device and the features contained in the table; and means for downloading the IRDB template to the telecommunication device.

Another aspect of the invention provides an apparatus for obtaining correct IRDB information for a mobile communication device in a multi-service telecommunication service provider environment. The apparatus includes means for querying a table containing a plurality of features associated with a mobile telecommunication devices for a plurality of wireless markets in accordance with the ESN received from the mobile communication device; means for selecting an IRDB template from an IRDB database based on the value of the ESN received from the mobile communication device and the features contained in the table; and means for downloading the IRDB template to the telecommunication device.

A further aspect of the invention provides a method for obtaining IRDB information for a mobile communication device in a multi-service telecommunication service provider environment. The method includes receiving an ESN from a mobile communication device; querying a table containing a plurality of features associated with a mobile telecommunication devices for a plurality of wireless markets in accordance with the ESN received from the mobile communication device; and selecting an IRDB template from an IRDB database based on the ESN received from the mobile communication device and the features contained in the table.

Still another aspect of the invention provides a method for obtaining correct IRDB information for a mobile communication device in a multi-service telecommunication service provider environment. The method includes receiving a registration notification message from a mobile communication device; querying a table containing a plurality of features associated with a mobile telecommunication devices for a plurality of wireless markets in accordance with the ESN received from the mobile communication device; selecting an IRDB template from an IRDB database based on the value of the ESN received from the mobile communication device and the features contained in the table; and downloading the IRDB template to the telecommunication device.

Yet another aspect of the invention provides a method for obtaining correct IRDB information for a mobile communication device in a multi-service telecommunication service provider environment. The method includes querying a table containing a plurality of features associated with a mobile telecommunication devices for a plurality of wireless markets in accordance with the ESN received from the mobile communication device; selecting an IRDB template from an IRDB database based on the value of the ESN received from the mobile communication device and the features contained in the table; and downloading the IRDB template to the telecommunication device.

These and various other aspects of the invention are pointed out with particularity in the claims annexed hereto and forming a part hereof. For a better understanding of the invention, however, reference should be made to the drawings which form a further part hereof, and to the accompanying descriptive matter, in which there are illustrated and described specific examples of an apparatus, system and method in accordance with the invention.

DESCRIPTION

In one embodiment, the present invention relates to an apparatus and method for dynamically obtaining current and correct IRDB information for a mobile communication device. More particularly, the invention relates to selecting a correct IRDB template at the moment that an IRDB download occurs, thus eliminating potential problems associated with sending incorrect (e.g., outdated) intelligent roaming information to a mobile communication device. The IRDB that is downloaded to a mobile communication device includes three separate. System Identifiers (hereinafter "SID") and System Operator Codes (hereinafter "SOC") values. The SID/SOC values are used to determine which wireless telecommunication service provider network the mobile communication device is roaming in. The SID/SOC values are stored in the memory circuit of the mobile communication device and include threes portions: (1) partner SID/SOC values; (2) favorite SID/SOC values; and (3) forbidden SID/SOC values. The partner SID/SOC values generally indicate the subscriber's home wireless telecommunication service provider's network. The favorite SID/SOC values indicate a favored roaming network in the absence of service by the partner network. Finally, the forbidden SID/SOC values indicate which wireless telecommunication service provider networks that the mobile communication device is forbidden from registering in.

When an IRDB download to a mobile communication device is required (e.g., when a wireless communication service provider roaming agreement has changed) the SMS message center is notified externally by another process usually via a network connection using a Short Message Peer to Peer (hereinafter "SMPP") protocol. The SMPP protocol is an open industry standard messaging protocol designed to simplify integration of data applications with wireless mobile networks such as the Global System for Mobile Communication (GSM), Time Division Multiple Access (TDMA), Code Division Multiple Access (CDMA), and Personal Digital Cellular (PDC). The SMPP protocol is widely deployed in the mobile telecommunications industry. The SMS message center is externally notified via the SMPP protocol of a decision to determine and download the correct IRDB template for a mobile communication device. There are two methods for selecting the correct IRDB for a download. The first method provides the IRDB template number that is stored in a file or table at the SMS message center. The second method uses a table or file to associate the mobile communication device's Numbering Plan Areas (hereinafter "NPA") to a particular template.

Figure 1:
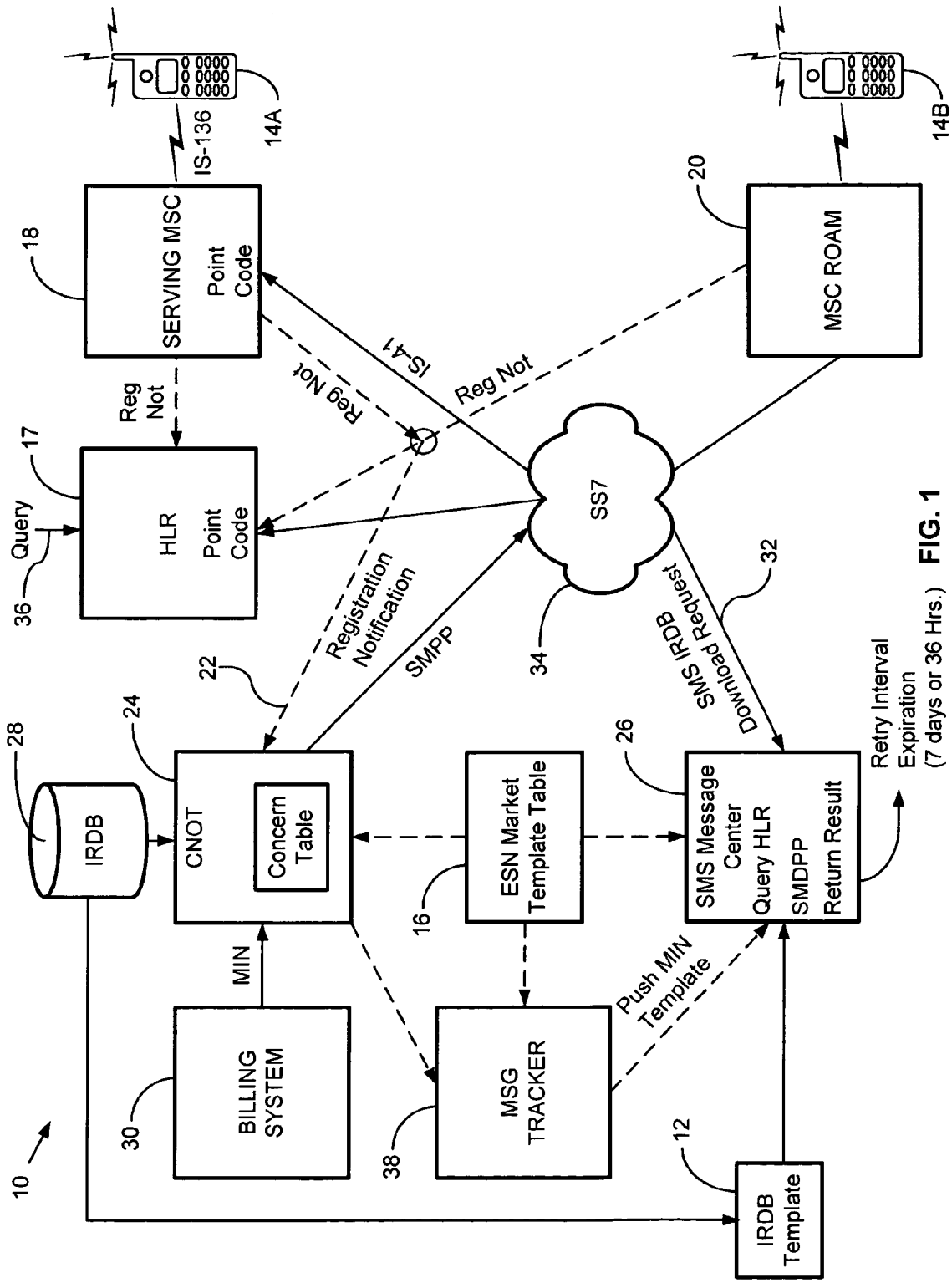
FIG. 1 is a schematic drawing of one embodiment of a system for obtaining IRDB database information.

FIG. 1 illustrates one embodiment of a system 10 for dynamically selecting the correct IRDB template 12 from an IRDB database 28 for a particular mobile communication device 14A, B and transmitting that template on-the-fly to the mobile communication device 14A, B. The system 10 eliminates the need to use pre-supplied static templates that may be obsolete or out-of-date by the time a periodic download of IRDB templates 12 is made. The system 10 takes into account the mobility of the mobile communication device 14A, B in order to deliver the most up-to-date IRDB template 12 that is appropriate for the specific mobile communication device 14A, B based on one or more attributes associated with the mobile communication device.

In one embodiment, the system 10 obtains the current Electronic Serial Number (hereinafter "ESN") of the mobile communication device at the moment that an IRDB template 12 is to be downloaded. Various features and attributes of a mobile communication device 14A, B can be determined from the device's ESN. Accordingly, the invention provides an ESN market template table 16 that contains ESN features and attributes for a variety of wireless markets. The ESN market template can be stored in a memory device or a storage device. The capabilities of the mobile communication device 14A, B and its features, such as single or dual band operation, IRDB capability, over the air programmability, mobile origination, manufacturer, and the like, can be resolved using the acquired ESN from the mobile communication devices 14A, B and comparing the acquired ESN to an ESN stored in the ESN market template table 16. The ESN in combination with the mobile communication device's Mobile Identification Number (hereinafter "MIN") assist in selecting the correct IRDB template 12 for downloading to mobile communication device 14A, B.

The MIN provides information associated with a wireless mobile communication system. The wireless system information includes the wireless market in which the mobile communication device 14A, B is currently operating. The wireless system information also is used to determine which IRDB template 12 the mobile communication device 14A, B is to receive from the download. The wireless system information also includes the type of system from which the mobile communication device is homed, whether the mobile communication device 14A, B operates over an "A" band, a "B" band, or a "PCS" band of frequencies, whether it is SOC locked, which wireless market location it is operating in, and the point code of the Home Location Register 17 (hereinafter "HLR"). Without the ESN information, a process cannot autonomously determine if the mobile communication device 14A, B can support IRDB template 12 downloads or whether it should select a single or dual band IRDB template 12 unless that information is stored for each MIN in a particular mobile communication system.

In addition to the ESN and the MIN, the NPA/NXX value can be used to determine the market prefix in which the mobile communication device 14A, B is operating and thus further assist in determining the correct IRDB template 12 for downloading to the mobile communication device 14A, B. Accordingly, the NPA/NXX value is associated with a particular IRDB template 12 for a mobile communication device 14A, B.

Within the system 10, there are two methods for dynamically delivering an IRDB template 12 to a mobile communication device 14A, B. The first method is a "pull" method and the second method is a "push" method.

The pull method is an individualized delivery of information to a mobile communication after a query has been made. Accordingly, the pull method passively waits for specific mobile communication devices 14A, B to initiate a registration with a wireless network. When a mobile communication device 14A, B turns on in a wireless network the serving Mobile Switching Center 18 (hereinafter "MSC") or the roaming MSC 20 sends a registration notification message 22 to the HLR 17 or to a Centralized Notification Platform 24 (hereinafter "CNOT"). Those skilled in the art will appreciate that the MSC 18, 20 is a switch that provides services and coordination between mobile communication devices 14A, B in a network and an external network. The pull method looks for mobile communication devices 14A, B to register with the wireless network and then attempts to deliver the IRBD template 12 to the mobile communication device 14A, B.

Accordingly, when a mobile communication device 14A, B is turned on and the registration message 22 is delivered to the CNOT 24, the CNOT 24 looks for a matching template number for the particular mobile communication device 14A, B. The template number is generally provided to the CNOT 24 by another process such as, for example, the billing system 30. Also, in one embodiment, another process can be used to prompt the CNOT 24 to look for a particular mobile communication device 14A, B and deliver the appropriate IRDB template 12 when it receives the registration notification 22.

The push method is a bulk delivery scheme that sends information out to each mobile communication device 14A, B within a wireless telecommunication service provider's network. The push method operates independently of whether the mobile communication device 14A, B is turned on within the current wireless network. In other words, the information is transmitted to the mobile communication device 14A, B regardless of whether it is turned on. Accordingly, an IRDB template 12 is pushed to the SMS message center 26 where an attempt is made to deliver the message containing the IRDB template 12 to a subscriber's mobile communication device 14A, B. If the subscriber is not present within the wireless network when the message is sent, the SMS message center 26 will reprocess the transmission at a later time. The message containing the IRBD template 12 is then continuously transmitted over the wireless network. Because the repeated transmissions may create network loading, in one embodiment, the retransmissions can be limited by a predetermined interval. A message tracker 38 also provides for storing messages from the SMS message center 26 or the CNOT 24 that contain the IRDB template 12.

A wireless telecommunication service provider's billing system 30 generally contains both the MIN and the ESN information for each mobile communication device 14A, B that subscribe to its wireless telecommunication service. The billing system 30 can either process MIN and ESN information locally or can supply the information to an external process for selecting the correct IRDB template 12. The external process can be incorporated within the billing system 30, or preferably, can be directly executed within the SMS message center 26. Located within the SMS message center 26 are several IRDB templates 12, one for each type of mobile communication device 14A, B and market location. There may be as few as a single IRDB template 12 stored in the SMS message center or up to 99 or more IRDB templates 12 depending on the wireless market requirements and the wireless markets that are served by each SMS message center 26. A template number is generally used to reference each IRDB template 12.

Conventional SMS message center 26 processes allow an IRDB template 12 to be mapped in the SMS message center 26 to the NPA-NXX of a mobile communication device 14A, B or to be specifically selected by supplying the IRDB template 12 number by an external process when an IRDB download request 30 is made over a Signaling System-7 network 34 (hereinafter "SS7"), for example. In one embodiment, the invention provides a method for dynamically selecting an IRDB template 12 by obtaining the ESN of a mobile communication device at the moment the IRDB template 12 is to be downloaded. As previously discussed, having the ESN, MIN, and the PDA/NXX values allows a precise selection of the correct IRDB template 12 because features and attributes of the mobile communication device 14A, B such as its technical limitations, capabilities, as well as other pertinent information can be ascertained from the ESN market template table 16.

The ESN can generally be obtained from the billing system 30 or customer database system, or from queries to the HLR 17. The HLR 17 is an SS7 network 34 database used in cellular networks. The HLR 17 is located in the Signal Control Point (SCP) of the wireless telecommunication service provider and is used to identify or verify a mobile communication system subscriber. The HLR 17 also contains various features and services of the subscriber's account. The HLR 17 is used whenever a subscriber makes a call within a home area supported by the mobile telecommunication service provider of record and is used to verify the legitimacy of a subscriber while roaming outside of its home area. When the subscriber is roaming, the local mobile telecommunication service provider queries the HLR 17 via an SS7 network 34 link. Once the subscriber has been verified the data is transferred via an SS7 link to a Visitor Location Register (VLR), where the data are maintained during the roaming period.

The HLR 17 contains the most current ESN of the mobile communication device 14A, B. If the billing system 30 contains a different ESN in its database as compared to the actual ESN of the mobile communication device 14A, B, a subscriber can still use their mobile communication device 14A, B within a wireless communication network provided that the ESN of the mobile communication device matches the ESN contained in the HLR 17 or the MSC 20. The ESN of the mobile communication device, however, must match the HLR 17 entry, or the subscriber will not be able to obtain any service until it is corrected, except for 911 calls.

The subscriber IRDB database 28 is not static and must be maintained up-to-date and replicated across several databases. Another problem that exists with current methods is the time lag between when the IRDB database 28 push is first initiated and when the IRDB template 12 is actually delivered to the mobile communication device 14A, B. During this time lag period, a subscriber could have changed mobile communication devices 14A, B, thus having a different ESN. Accordingly, if the ESN is supplied to the IRDB process at the time a push is first initiated, a wrong decision may be made in selecting the correct IRDB template 12. If, however, the ESN information is obtained at the time that an IRDB template 12 is delivered, then errors in selecting the correct IRDB template 12 can be vastly reduced. Another problem that often occurs is an IRDB push request to mobile communication devices 14A, B that are not IRDB capable.

When the SMS message center 26 or an MC message center sends a message to a mobile communication device 14A, B that supports IRDB teleservices, the SMS message center 26 first queries 36 the HLR 17 for the mobile station's (hereinafter "MS") current SMS message center's routing address. The results of the query 36 include the MS's ESN and current SMS message center address if the SMS message center delivery is permitted to that mobile communication device 14A, B. Current IRDB processes do not use the ESN field in the return results or from any source, to select the correct IRDB template 12 slated for download.

Figure 2:
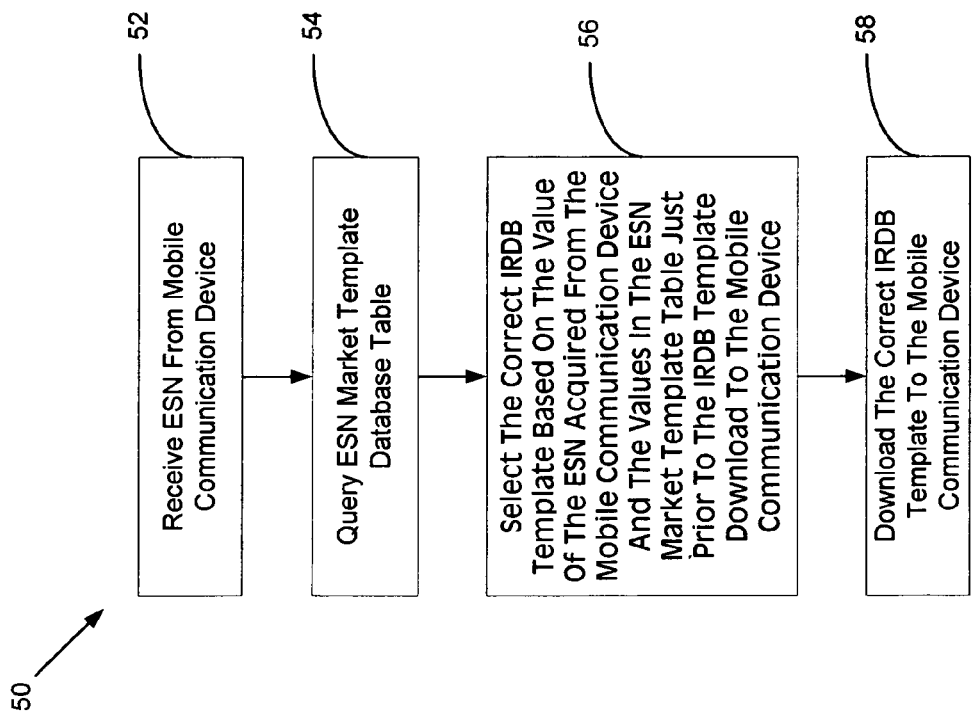
FIG. 2 is a flow diagram showing one embodiment of an implementation of a system for obtaining IRDB database information.

FIG. 2 illustrates one embodiment of a process 50 according to the invention. Block 52 receives an ESN from a mobile communication device 14A, B. Block 54 queries the ESN market template database table 16 of ESN ranges, MIN values, and NPA/NXX values. Block 56 selects the correct IRDB template 12 based on the value of the ESN acquired from the mobile communication device and the values in the ESN market template table 16 just prior to the IRDB template download 12 to the mobile communication device 14A, B. Block 58 downloads the correct IRDB template to the mobile communication device 14A, B. Because the selection of the appropriate IRDB template is made just prior to downloading the IRDB template 12 to the mobile communication device 14A, B, the chance of errors caused by equipment changes that are not completely replicated across all network elements is reduced. Again, the HLR 17 is the final authority for the ESN since a user cannot obtain wireless services if the ESN value does not match the value stored in the mobile communication device and the HLR 17. The data stored within the ESN capabilities database do not change unless new ESNs are added to the database or errors in are detected in the database. The ESN and NPA databases are separate tables in the same database that are joined by common fields. Additional tables may be required to complete the query.

Listed in TABLE 1 below are the tables and their joint relationships, which provides one possible solution in accordance with the invention:

TABLE 1

| ESN_TO_FEATURE | MARKET_TO_TEMPLATE | NPA_TO_MARKETCODE | |
|---|---|---|---|
| ESN_BEGIN | | | |
| ESN_END | | | |
| DBAN → | DBAN | | |
| SBAN → | SBAN | | |
| | MARKET_CODE → | MARKET_CODE | |
| | | NPA_NXX | |
| | | TEMPLATE_NUMBER → | Returned |

Accordingly, supplying the ESN and NPA/NXX information returns the Template Number stored on the SMS message center 26.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

What is claimed is:

1. A memory for storing data for access by an application program executed by a computer for obtaining IRDB information for a mobile communication device in a multi-service telecommunication service provider environment, comprising:
   a table stored in the memory, the table containing a plurality of ESN features associated with mobile telecommunication devices for a plurality of wireless markets, the ESN features being compared with an ESN acquired from a home location register associated with a mobile communication device in a multi-service telecommunication service provider network for determining an up-to-date IRDB template to be downloaded to the mobile communication device;
   wherein comparing the ESN acquired from the home location register that is associated with the mobile communications occurs when the IRDB template is to be downloaded to ensure correct IRDB template selection from an IRDB database of available IRDB templates.

2. The memory of claim 1, wherein the ESN features further comprises capabilities of the mobile communication device selected from the group consisting of single band, dual band, IRDB capability, over the air programmability, mobile origination, and manufacturer.

3. The memory of claim 1, further comprising an MIN associated with the mobile communication device.

4. The memory of claim 3, wherein the MIN value provides wireless mobile communication system information about a wireless market that the mobile communication device is currently operating in.

5. The memory of claim 4, wherein the wireless mobile communication system information further comprises information selected from the group consisting of type of system from which the mobile communication device is homed, operation over an "A" band, operation over a "B" band, operation over a "PCS" band, SOC locked status, wireless market location the mobile communication device is operating in, and point code of an HLR.

6. The memory of claim 1, further comprising an NPA/NXX value associated with the mobile communication device.

7. The memory of claim 6, wherein the NPA/NXX value includes a wireless market prefix in which the mobile communication device is operating.

8. The memory of claim 7, wherein the NPN/NXX value provides information to assist in determining the IRDB template to download to the mobile communication device.

9. The memory of claim 6, wherein the NPA/NXX value is associated with a particular IRDB template for the mobile communication device.

10. The memory of claim 1, further comprising a message tracker for storing the up-to-date IRDB template.

11. An apparatus for obtaining IRDB information for a mobile communication device in a multi-service telecommunication service provider environment, the apparatus comprising:
   means for containing a plurality of ESN features associated with mobile telecommunication devices for a plurality of wireless markets; means for comparing the ESN features with an ESN acquired from a home location register associated with a mobile communication device in a multi-service telecommunication service provider network for determining an up-to-date IRDB template to be downloaded to the mobile communication device;
   wherein the means for comparing compares the ESN acquired from the home location register associated with the mobile communications when the IRDB template is to be downloaded to ensure correct IRDB template selection from an IRDB database of available IRDB templates.

12. An apparatus for obtaining IRDB information for a mobile communication device in a multi-service telecommunication service provider environment, the apparatus comprising:
   means for receiving an ESN from a home location register associated with a mobile communication device;
   means for querying a table containing a plurality of features associated with a mobile telecommunication devices for a plurality of wireless markets in accordance with the ESN received from the home location register associated with the mobile communication device; and
   means for selecting an IRDB template from an IRDB database based on the ESN received from the home location register associated with the mobile communication device and the features contained in the table 1 wherein the ESN received from the home location device associated with the mobile communications device is compared to the features contained in the table when the IRDB template is to be downloaded to ensure correct IRDB template selection from an IRDB database of available IRDB templates.

13. An apparatus for obtaining correct IRDB information for a mobile communication device in a multi-service telecommunication service provider environment, the apparatus comprising:

means for receiving a registration notification message from a mobile communication device;

means for querying a table containing a plurality of features associated with a mobile telecommunication devices for a plurality of wireless markets in accordance with the ESN received from a home location register associated with the mobile communication device;

means for selecting an IRDB template from an IRDB database based on the value of the ESN received from the home location register associated with the mobile communication device and the features contained in the table; and means for downloading the IRDB template to the telecommunication device;

wherein the ESN received from the home location register associated with the mobile communications is compared to the features contained in the table when the IRDB template is to be downloaded to ensure correct IRDB template selection from an IRDB database of available IRDB templates.

14. An apparatus for obtaining correct IRDB information for a mobile communication device in a multi-service telecommunication service provider environment, the apparatus comprising:

means for querying a table containing a plurality of features associated with a mobile telecommunication devices for a plurality of wireless markets in accordance with the ESN received from a home location register associated with the mobile communication device;

means for selecting an IRDB template from an IRDB database based on the value of the ESN received from the home location device associated with the mobile communication device and the features contained in the table; and means for downloading the IRDB template to the telecommunication device;

wherein the ESN received from the home location register associated with the mobile communications is compared to the features contained in the table when the IRDB template is to be downloaded to ensure correct IRDB template selection from available IRDB templates stored in the IRDB database.

15. A method for obtaining IRDB information for a mobile communication device in a multi-service telecommunication service provider environment, the method comprising:

receiving an ESN from a home location register associated with a mobile communication device;

querying a table containing a plurality of features associated with a mobile telecommunication devices for a plurality of wireless markets in accordance with the ESN received from the home location register associated with the mobile communication device; and selecting an IRDB template from an IRDB database based on the ESN received from the home location register associated with the mobile communication device and the features contained in the table;

wherein the ESN received from the home location register associated with the mobile communications is compared to the features contained in the table when the IRDB template is to be downloaded to ensure correct IRDB template selection from available IRDB templates stored in the IRDB database.

16. The method of claim 15, wherein querying a table further comprises querying an ESN market template database.

17. The method of claim 15, wherein querying a table further comprises querying ESN ranges.

18. The method of claim 15, wherein querying further comprises querying MIN values.

19. The method of claim 15, wherein querying further comprises querying NPA/NXX values.

20. The method of claim 15, further comprising comparing the features with an ESN acquired from the home location register associated with a mobile communication device in a multi-service telecommunication service provider network for determining an up-to-date IRDB template for mobile communication device.

21. The method of claim 15, further comprising downloading the IRDB template to the telecommunication device.

22. A method for obtaining correct IRDB information for a mobile communication device in a multi-service telecommunication service provider environment, the method comprising:

receiving a registration notification message from a mobile communication device;

querying a table containing a plurality of features associated with a mobile telecommunication devices for a plurality of wireless markets in accordance with the an ESN received from a home location register associated with the mobile communication device;

selecting an IRDB template from an IRDB database based on the value of the ESN received from the home location register associated with the mobile communication device and the features contained in the table; and downloading the IRDB template to the telecommunication device, wherein the ESN received from the home location register associated with the mobile communications is compared to the features contained in the table when the IRDB template is to be downloaded to ensure correct IRDB template selection from available IRDB templates stored in the IRDB database.

23. The method of claim 22, wherein querying a table further comprises querying an ESN market template database.

24. The method of claim 22, wherein querying a table further comprises querying ESN ranges.

25. The method of claim 22, wherein querying further comprises querying MIN values.

26. The method of claim 22, wherein querying further comprises querying NPA/NXX values.

27. The method of claim 22, further comprising comparing the features with an ESN acquired from the home location register associated with the mobile communication device in a multi-service telecommunication service provider network for determining an up-to-date IRDB template for mobile communication device.

28. A method for obtaining correct IRDB information for a mobile communication device in a multi-service telecommunication service provider environment, the method comprising:

querying a table containing a plurality of features associated with a mobile telecommunication devices for a plurality of wireless markets in accordance with the an ESN received from a home location register associated with the mobile communication device;

selecting an IRDB template from an IRDB database based on the value of the ESN received from the home location register associated with the mobile communication device and the features contained in the table; and downloading the IRDB template to the telecommunication device;

wherein the ESN received from the home location register associated with the mobile communications is compared to the features contained in the table when the IRDB template is to be downloaded to ensure correct IRDB template selection from available IRDB templates stored in the IRDB database.

\* \* \* \* \*